United States Patent Office 2,903,440
Patented Sept. 8, 1959

2,903,440

THERMO SETTING RESIN FROM A LIQUID BUTADIENE POLYMER AND STYRENE

Randall G. Heiligmann, Columbus, Ohio, assignor, by mesne assignments, to Esso Research and Engineering Company, Linden, N.J., a corporation of Delaware No Drawing. Application April 8, 1958
Serial No. 727,048

8 Claims. (Cl. 260—88.1)

This invention relates to the production of synthetic resinous materials which are completely insoluble, infusible, hard masses possessing good machineability and good dielectric properties, and is a continuation-in-part of application Serial No. 452,446, filed August 26, 1954, and now abandoned.

It is known that linear polymers and copolymers of butadiene of an oily or rubber-like consistency can be cured at temperatures of 225–300° C. to form resins. These resins are similar to hard rubber except that no vulcanizing agent is used in their preparation. The products are characterized by having superior electrical properties. When prepared from a highly purified GR–S rubber they possess a power factor of about 0.0005 at $10^6$ to $10^9$ cycles and have therefore found use as an insulation material for radar equipment. They are also resistant to chemical action and physical impact.

Such resins can be easily made by heating the polymers of butadiene or copolymers of butadiene and styrene at temperatures from 100 to 175° C. in the presence of 2.0 to 10% or more of ditertiary butyl peroxide as described in application Serial No. 334,356, filed January 30, 1953 in the names of Anthony H. Gleason and Joseph F. Nelson, now U.S. Patent 2,772,254.

It has now been found that the hardness of such resins can be improved by heating the oily polymers in the presence of 5–40% of a reactive monomer such as a vinyl aromatic, e.g. styrene, vinyl toluene, alkyl styrenes, halo styrenes, vinyl naphthalene, or other reactive monomer such as maleic anhydride, alkyl maleates or fumarates, etc.

The polymers to which the present invention is primarily applicable are those prepared by copolymerizing 100 to 50 parts of butadiene-1,3 and 0 to 50 parts of styrene with sodium. A particularly suitable polymer is an oily copolymer of 75 to 85% butadiene and 15 to 25% styrene. The polymerization is carried out in a reaction diluent at temperatures ranging from about 25 to 95° C., or preferably between 40 and 90° C., and is desirably continued until complete conversion of monomers is obtained. About 1.2 to 5 parts, preferably 1.5 to 4 parts, of finely divided metallic sodium per 100 parts of monomers are used as catalyst. Materials used as diluents in the polymerization are inert hydrocarbons which remain liquid under the reaction conditions employed. Accordingly, the diluents employed have a boiling point between about 10 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight-run mineral spirits such as "Varsol" having a boiling range between about 150 and 200° C., butane, benzene, cyclohexane, xylenes, toluenes, pentanes and similar inert hydrocarbons are also useful, individually or in admixture with each other. The hydrocarbon diluents are used in amounts ranging from 100 to 500, preferably 150 to 300 parts per 100 parts of monomers. In other words, the resulting oily composition as synthesized normally contains about 20% to 50% of the polymer dissolved in a hydrocarbon solvent. When desired, more concentrated compositions can be produced from the synthesis product by stripping off excess solvent. For purposes of the present invention, it is desirable to concentrate non-volatile matter to at least 90 and preferably 100%. The presence of solvent is unnecessary and is undesirable except in small amounts.

Furthermore, to promote the original polymerization reaction and to assure the formation of a light-colored product, it is also desirable to employ in the polymerization about 10 to 40 or more parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight percent (based on sodium) of an alcohol such as methanol, isopropanol or n-amyl alcohol, especially where the sodium catalyst particles are relatively coarse.

The resulting product may vary from a low viscosity oil to a solid high molecular weight polymer and the invention is equally applicable to any such product of whatever intrinsic viscosity.

The present invention is based on the discovery that when products of the nature described above are heated in the presence of 5–40% of a reactive monomer and 2.5 to 3% by weight of di-t-butyl peroxide, the temperature at which curing occurs can be lowered to 100–175° C. The use of di-tertiary-butyl peroxide in this reaction is critical since other peroxides give inferior results.

The curing should take place over a rising temperature range of 100 to 150° C. The rate of increase will vary inversely with the thickness of the sample being cured. A typical schedule is as follows:

Not less than about 8 hrs. at 100–110° C.
Not less than about 18 hrs. at 110–120° C.
Not less than about 18 hrs. at 120–130° C.
Not less than about 18 hrs. at 130–150° C.

The schedule may be lengthened somewhat depending on the hardness and distortion temperature desired in the resin, but a stepwise increase in curing temperature is desirable both as a means of controlling the rate of polymerization and to minimize mold adhesion. Too rapid curing can cause the castings to crack as a result of inadequate heat dissipation.

Fillers such as mica, asbestos, silica, dicolite, etc. may be used to increase impact strength, improve the thermal conductivity, and shorten the curing time of these resins.

The resins obtained by the process of this invention have excellent dielectric properties. The dielectric constant is about 2.5 and the dielectric strength is about 800 volts per mill. They are not thermo-plastic and must be cased or machined to the desired shape. The specific gravity is in the range of 0.99 to 1.01 depending on the cure. Distortion temperatures may range up to 150° C. and higher. Under no load the resin possesses considerable form stability at temperatures above the distortion point. At a medium cure the resin will have a Rockwell–M hardness of about 100. The impact strength is adequate for commercial usage. The resin machines fairly well if sharp tools are used, giving cuttings which are fine and powdery.

The following examples illustrate the benefits to be obtained by the process of this invention.

Example 1

An oily copolymer of butadiene and styrene was prepared according to the following recipe:

| | | |
|---|---|---|
| Butadiene | parts by wt | 80 |
| Styrene | do | 20 |
| Naphtha | do | 200 |
| Dioxane | do | 30 |
| Sodium | do | 1.5 |
| Isopropanol | do | 0.3 |
| Temperature | ° C | 50 |

Complete conversion was obtained in eight hours. The catalyst was destroyed and removed from the resulting crude product. The product was finished to contain 100% non-volatile matter as described above and had a viscosity of 1.4 poises at 50% N.V.M.

Example 2

Eighteen grams of the copolymer of Example 1 was mixed with 2.0 grams of styrene and 0.4 gram of ditertiary butyl peroxide and the mixture heated for 24 hours at 125° C. A very hard casting having a Rockwell hardness of 90–100 was obtained. A similar casting without styrene has a hardness of about 80.

Example 3

The polymer of Example 1 was mixed with 20% styrene and 4% tertiary butyl perbenzoate and cured as in Example 2. The resulting resin had a Rockwell hardness of 60.

Example 4

The experiment of Example 3 was repeated using 30% styrene. The resulting resin had a Rockwell hardness of 90.

Example 5

The experiment of Example 3 was carried out using 4% cumene hydroperoxide as the catalyst. The resulting resin was so cheesy that no hardness values were obtained.

Example 6

The experiment of Example 3 was carried out using 5% ascaridole as the catalyst. The resulting resin again was so cheesy no hardness values were obtained.

Example 7

Resin panels were made from a resin mix of 50 parts of the resin of Example 1, 50 parts monomethyl styrene, and 5 parts ditertiary butyl peroxide. The panels were pressed to ⅛ inch thickness in a mold for 90 minutes at 127° C. At the end of this time the panels were removed from the mold and given an 18–20 hr. post cure at 300° F. The flexure strength (ASTM 790–49T) was 600 p.s.i. for the final cured product. The Rockwell hardness was 103.

The above examples clearly show that styrene increases the hardness of resins made from liquid butadiene-styrene copolymers and that ditertiary butyl peroxide is far superior to other peroxides as catalyst.

The nature of the present invention having been thus fully set forth and specific examples of the same given, what is claimed as new and useful and desired to be secured by Letters Patent is:

1. A process for preparing a solid resin from a liquid sodium polymer of 100 to 50% butadiene-1,3 and 0 to 50% styrene which comprises heating the polymer at a temperature between 110° C. and 175° C. in the presence of 2.0 to 4.0% of ditertiary butyl peroxide and 5 to 40% of a reactive monomer chosen from the group consisting of styrene and vinyl toluene.

2. Process according to claim 1 in which the polymer is polybutadiene.

3. Process according to claim 1 in which the polymer is an oily copolymer of 75 to 85% butadiene and 15 to 25% styrene.

4. Process according to claim 1 in which the reactive monomer is styrene.

5. Process according to claim 1 in which the reactive monomer is vinyl toluene.

6. A solid resin comprising a liquid sodium polymer of 100 to 50% butadiene-1,3 and 0 to 50% styrene which has been reacted with 5 to 40% of a reactive monomer chosen from the group consisting of styrene and vinyl toluene at 100–150° C. in the presence of ditertiary butyl peroxide, said resin having a dielectric constant of about 2.5, a dielectric strength of about 800 volts per mil, a specific gravity between 0.99 and 1.01, a distortion temperature of about 150° C., and a Rockwell–M hardness of 90–100.

7. A solid resin according to claim 6 in which the reactive monomer is styrene.

8. A solid resin according to claim 6 in which the reactive monomer is vinyl toluene.

References Cited in the file of this patent

UNITED STATES PATENTS

| | | |
|---|---|---|
| 1,938,730 | Tschunker et al. | Dec. 12, 1933 |
| 2,317,859 | Soday | Apr. 27, 1943 |
| 2,383,084 | Rummelsburg | Aug. 21, 1945 |
| 2,460,300 | Le Fevre et al. | Feb. 1, 1949 |
| 2,512,697 | Te Grotenhuis | June 27, 1950 |
| 2,688,009 | Courch et al. | Aug. 31, 1954 |

FOREIGN PATENTS

| | | |
|---|---|---|
| 593,072 | Great Britain | Oct. 8, 1947 |
| 679,562 | Great Britain | Sept. 17, 1952 |